(12) United States Patent
Kawasaki

(10) Patent No.: US 10,228,493 B2
(45) Date of Patent: Mar. 12, 2019

(54) OPTICAL COMPONENT AND METHOD OF MANUFACTURING THE SAME

(71) Applicant: CANON KABUSHIKI KAISHA, Tokyo (JP)

(72) Inventor: Junji Kawasaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/478,439

(22) Filed: Apr. 4, 2017

(65) Prior Publication Data

US 2017/0293051 A1   Oct. 12, 2017

(30) Foreign Application Priority Data

Apr. 12, 2016  (JP) .................. 2016-079514

(51) Int. Cl.
| | | |
|---|---|---|
| *G02B 1/118* | (2015.01) | |
| *G02B 5/00* | (2006.01) | |
| *G02B 27/00* | (2006.01) | |
| *G02B 1/14* | (2015.01) | |

(52) U.S. Cl.
CPC .............. *G02B 1/118* (2013.01); *G02B 1/14* (2015.01); *G02B 5/003* (2013.01); *G02B 27/0018* (2013.01)

(58) Field of Classification Search
CPC .. G02B 1/118; G02B 1/11; G02B 1/14; G02B 5/003; G02B 5/005; G02B 27/0018
USPC ........................................................ 359/601
See application file for complete search history.

(56) References Cited

U.S. PATENT DOCUMENTS

| | | | |
|---|---|---|---|
| 7,811,684 B2 | 10/2010 | Yamada et al. | |
| 7,931,936 B2 | 4/2011 | Yamada et al. | |
| 8,318,607 B2* | 11/2012 | Rathsack | ............ H01L 21/0271 216/42 |
| 8,501,270 B2 | 8/2013 | Yamada et al. | |
| 8,814,369 B2* | 8/2014 | Sakai | ..................... G02B 1/105 359/601 |
| 2005/0233113 A1 | 10/2005 | Kotani et al. | |
| 2006/0188666 A1 | 8/2006 | Yamada et al. | |
| 2009/0022954 A1 | 1/2009 | Kotani et al. | |

(Continued)

FOREIGN PATENT DOCUMENTS

| | | |
|---|---|---|
| JP | 2005-275372 A | 10/2005 |
| JP | 2006-259711 A | 9/2006 |
| JP | 2015-176016 A | 10/2015 |

OTHER PUBLICATIONS

Extended European Search Report in European Application No. 17000594.6 (dated Aug. 9, 2017).

(Continued)

*Primary Examiner* — William R Alexander
(74) *Attorney, Agent, or Firm* — Venable LLP

(57) ABSTRACT

An optical component has a surface including an optically effective area having an antireflection coating arranged thereon and an adjoining optically non-effective area having a light-shielding coating film arranged thereon. An edge portion of the antireflection coating and an edge portion of the light-shielding coating film overlap with each other to form an overlap area having a width between 0.5 μm and 50 μm. The antireflection coating is formed so as to show a thickness decreasing toward an edge thereof in the overlap area.

8 Claims, 3 Drawing Sheets

(56) References Cited

U.S. PATENT DOCUMENTS

| | | | |
|---|---|---|---|
| 2009/0075217 A1* | 3/2009 | Brodsky | G03F 7/2028 430/327 |
| 2009/0257127 A1* | 10/2009 | Okayama | G02B 1/11 359/601 |
| 2012/0050871 A1* | 3/2012 | Sakai | G02B 1/105 359/601 |
| 2012/0262794 A1 | 10/2012 | Uchida et al. | |
| 2014/0063610 A1* | 3/2014 | Murata | B29D 11/00326 359/613 |
| 2014/0091488 A1* | 4/2014 | Ozaki | B29C 43/18 264/2.4 |
| 2015/0077841 A1* | 3/2015 | Matsuo | G02B 5/005 359/359 |
| 2015/0378058 A1 | 12/2015 | Sonoda et al. | |
| 2016/0011415 A1* | 1/2016 | Takada | G02B 27/0018 348/148 |
| 2016/0377767 A1 | 12/2016 | Sonoda et al. | |
| 2018/0246256 A1* | 8/2018 | Abe | G02B 1/11 |

OTHER PUBLICATIONS

First Office Action in Chinese Application No. 201710230433.X (dated Jan. 14, 2019).

* cited by examiner

OPTICAL COMPONENT AND METHOD OF MANUFACTURING THE SAME

BACKGROUND OF THE INVENTION

Field of the Invention

This invention relates to an optical component equipped with an antireflection coating having a fine textured structure of less than the use wavelength (or a sub-wavelength structure SWS) on the optically effective area thereof and also to a method of manufacturing the same.

Description of the Related Art

The optical components such as lenses and prisms that are being employed in the optical systems of optical equipment, including cameras and projectors, are equipped with means for preventing harmful rays other than the imaging light flux from striking the imaging plane of the optical system. Such harmful rays include rays of light reflected from the light input/output surface, which is the optically effective area, of the optical component and also those reflected from the surface other than the light input/output surface (e.g., the lens edge portion), which is the optically non-effective area, of the optical component.

Since such harmful rays can give rise to flares and ghost, various means have been and are being employed to prevent harmful rays from taking place. Techniques for preventing harmful rays from taking place are roughly divided into two types listed below.

(a) techniques for forming an anti-reflection means for the purpose of improving the transmittance of light on the light input/output surface operating as optically effective area, thereby reducing the reflectance thereof.
(b) techniques for forming an anti-reflection means for the purpose of improving the absorptance of light on the end surface (e.g., the lens edge portion) operating as optically non-effective area, thereby reducing the reflectance thereof.

A practice of forming an antireflection coating of laminated dielectric thin film, which is generally referred to as multi-coat, on the light input/output surface of the optical component operating as optically effective area as technique belonging to (a) has been and still is going on.

A practice of forming a light-shielding coating film for not allowing light to be transmitted on the end surface (e.g., the edge portion of lens lateral end) of the optical component operating as optically non-effective area as technique belonging to (b) has been and still is going on.

In the instances of lenses, while the light input/output surface (lens surface) operating as optically effective area is a smooth surface area, the outer peripheral side surface (lens edge portion) operating as optically non-effective area is made to be a rough surface representing an arithmetic average roughness Ra between 1 µm and 50 µm in order to improve both the light shielding function thereof by way of light scattering and the adhesion strength of the light-shielding coating film. Then, since it is practically impossible to make the edge of the light-shielding coating film formed on such a rough surface to perfectly agree with the edge of the rough surface area, the light-shielding coating film is formed so as to slightly ride on the smooth surface area operating as optically effective area.

Additionally, if a gap is produced in the boundary area between the antireflection coating formed on the optically effective area and the light-shielding coating film formed on the optically non-effective area, neither the antireflection coating nor the light-shielding coating film is found in the gap and hence strong harmful rays can be produced there. Thus, the antireflection coating and the light-shielding coating film are normally made to partly overlap with each other in order to prevent such an undesirable situation from taking place. As for which of the antireflection coating and the light-shielding coating film is to be laid first, generally the antireflection coating is directly formed on the lens substrate and then the light-shielding coating film is laid thereon in view of that the antireflection coating is expected to reduce the difference between the refractive index of the antireflection coating and that of the lens so as to minimize reflections of light by the interface thereof.

In other words, conventionally, a multi-coat antireflection coating 5 is formed on a lens substrate 1 and then a light-shielding coating film 2 is formed on the antireflection coating 5 as illustrated in FIG. 1. More specifically, the edge of the light-shielding coating film is normally made to cover part of the multi-coat antireflection coating 5 formed on the smooth surface area 1b of the lens substrate.

In recent years, antireflection coatings using a fine textured structure that is not greater than the use wavelength as described in Japanese Patent Application Laid-Open No. 2006-259711 and Japanese Patent Application Laid-Open No. 2005-275372 have also been utilized to replace the multi-coat antireflection coating in order to make the antireflection coating get to a higher level of performance. Additionally, Japanese Patent Application Laid-Open No. 2015-176016 describes an arrangement where an antireflection coating having such a fine textured structure is employed as reflection prevention means for a rays-of-light-wise (optically) effective area and the edge of the light-shielding coating film formed in a rays-of-light-wise (optically) non-effective area lies on the antireflection coating formed on the smooth surface area, which is the rays-of-light-wise (optically) effective area.

When a light-shielding coating film is formed so as to lie on an antireflection coating having a fine textured structure and this multilayered region is found on the smooth surface area of the substrate surface, there can arise a problem that a phenomenon of film floating or film peeling occurs along the interface between the antireflection coating and the underlying substrate to consequently produce ghost because the adhesion strength between the antireflection coating having a fine textured structure and the underlying substrate surface is weak and hence the antireflection coating cannot withstand the tensile stress of the light-shielding coating film lying thereon. Particularly, since antireflection coatings having a fine textured structure have only a poor environmental durability, they often show the phenomenon of film floating or film peeling in operation due to degradation over time.

In view of the above-described circumstances, therefore, the object of the present invention is to provide a high quality optical component that is free from ghost due to film floating or film peeling of the antireflection coating thereof even when the edge of the light-shielding coating film formed on the antireflection coating having a fine textured structure lies on the smooth surface area of the optically effective area of the optical component and also a method of manufacturing such an optical component.

SUMMARY OF THE INVENTION

An optical component according to the present invention has a surface including an optically effective area having an antireflection coating arranged thereon and an adjoining optically non-effective area having a light-shielding coating film arranged thereon, an edge portion of the antireflection coating and an edge portion of the light-shielding coating film overlap with each other to form an overlap area having a width between 0.5 µm and 50 µm, the antireflection coating being formed so as to show a thickness decreasing toward an edge thereof in the overlap area.

Preferably, the optically effective area having the antireflection coating arranged thereon shows a smooth surface whereas the optically non-effective area having the light-shielding coating film arranged thereon shows a rough surface and the overlap area is located on the smooth surface.

Preferably, the antireflection coating has a fine textured structure of less than a use wavelength formed on the smooth surface and the light-shielding coating film is an opaque coating film formed on the rough surface.

Preferably, the antireflection coating is formed so as to show a thickness decreasing toward the edge thereof in a region of a width between 5 µm and 1.8 mm containing the overlap area therein.

A method of manufacturing an optical component according to the present invention includes: a first step of preparing a transparent substrate having a surface including an optically effective area and an adjoining optically non-effective area; a second step of forming an antireflection coating having a fine textured structure of less than a use wavelength on the optically effective area so as to make it show a thickness decreasing toward an edge thereof; and a third step of forming a light-shielding coating film as opaque coating film so as to make an edge portion thereof overlap the antireflection coating with a width between 0.5 µm and 50 µm and also make an edge thereof to be located in an area having the decreasing thickness of the antireflection coating.

Preferably, the light-shielding coating film is formed so as to show a film thickness of not less than 3 µm and not more than 50 µm except the area located within 50 µm from the edge thereof.

Preferably, the antireflection coating is formed so as to show a film thickness decreasing toward the edge in an area having a width between 5 µm and 1.8 mm.

Preferably, the antireflection coating is formed by immersing an aluminum-containing film formed by sol-gel method in hot water or exposing the aluminum-containing film to steam.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An optical component according to the present invention includes a transparent substrate having a surface where a smooth surface area that operates as an optically effective area and a rough surface area that operates as an optically non-effective area are arranged so as to adjoin each other. The expression that the substrate is transparent means that the substrate is made of a material that transmits rays of light of the use wavelength. The optically effective area is the surface area where rays of light enter into and exit from the substrate when the optical component is in operation, whereas the optically non-effective area is the surface area other than the surface area where rays of light enter into and exit from the substrate in operation. Namely, the optically effective area refers to a light input/output surface and the optically non-effective area refers to the surface area other than the light input/output surface. Normally, rays of light are refracted when they pass through the light input/output surface and the optical component controls the course of rays of light or fluxes of light by means of such refractions. For this reason, the light input/output surface is referred to the optically effective area of the optical component.

Figure 1:
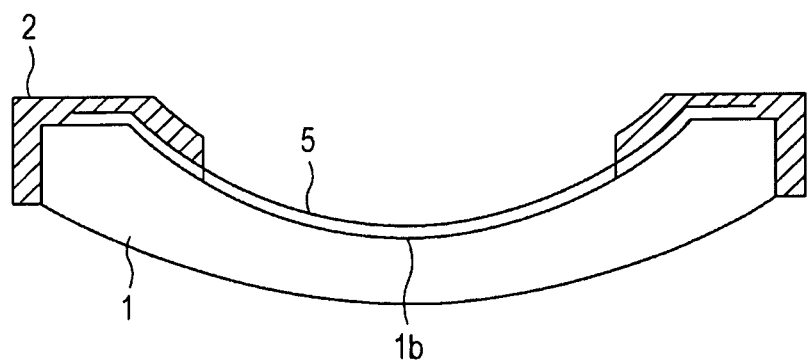
FIG. 1 is a schematic cross-sectional view of a known exemplar optical component.
Figure 2:
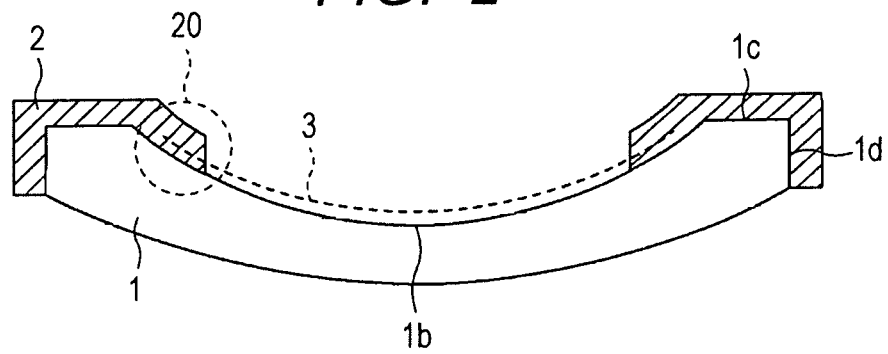
FIG. 2 is a schematic cross-sectional view of an embodiment of optical component according to the present invention.

FIG. 2 illustrates a concave meniscus lens as an optical component according to the present invention, although the present invention is by no means limited to such a lens. For example, an optical component according to the present invention may be a biconcave lens, a flat concave lens, an aspherical lens, a free curved surface lens or a lens having a profile different from any of the above-listed ones. Furthermore, an optical component according to the present invention may not necessarily be a lens but may be a prism. Note that, when an optical component according to the present invention is a prism, the optically effective area is the surface thereof through which light enters into and exits from the prism substrate and the optically non-effective area is the surface thereof that includes all the lateral surfaces of the prism. The surface of the prism that totally reflects the light penetrating into the prism substrate is not the surface through which light enters into and exits from the substrate and hence that surface may be referred to as optically non-effective area according to the above-described definition. However, reflections of light by that surface are not to be prevented but rather to be promoted and therefore a light-shielding coating film should not be arranged there. In other words, while that surface may be defined as an optically non-effective area, the surface differs from the lateral surfaces of the prism and hence should be regarded neither as an optically effective area nor as an optically non-effective area.

The surface of the substrate included in an optical component according to the present invention includes both a smooth surface area that operates as optically effective area and a rough surface area that operates as optically non-effective area and the smooth surface area and the rough surface area are arranged so as to adjoin each other by way of a border line or a boundary area. As pointed out earlier, the optically non-effective area that typically includes the outer peripheral lateral surface of the lens is formed as "a rough surface" representing an arithmetic average roughness Ra between about 1 µm and about 50 µm in order to improve both the light shielding function thereof by scattering of light and the adhesion strength of the light-shielding coating film. To the contrary, the optically effective area is a surface area for refracting or reflecting rays of light or fluxes of light so that the optically effective area is required to be a surface area representing an Ra value that is smaller than the use wavelength of light (e.g., in the case of visible light between 0.3 μm and 0.8 μm), preferably an Ra value that is smaller than the use wavelength of light by one digit (e.g., not greater than 0.03 μm). For the purpose of the present invention, "a smooth surface area" refers to such a surface area.

Figure 3:
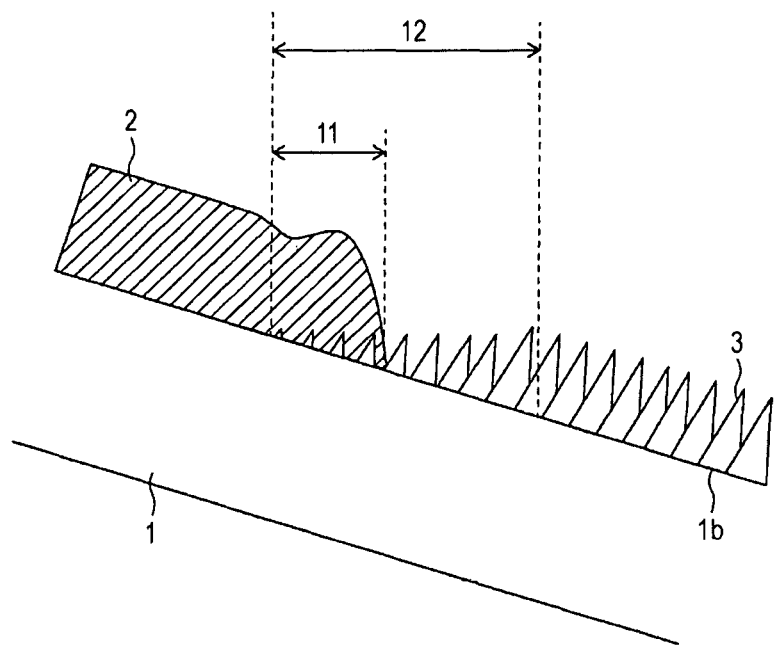
FIG. 3 is an enlarged schematic cross-sectional view of a part of the optical component of FIG. 2.

FIG. 2 is a schematic cross-sectional view of an embodiment of optical component according to the present invention, which is a concave meniscus lens. FIG. 3 is an enlarged schematic cross-sectional view of a part of the optical component of FIG. 2, (which part is the region of the optical component where antireflection coating 3 and light-shielding coating film 2 overlap with each other on the smooth surface area of substrate 1 and its vicinity 20). The substrate 1 that the optical component of this embodiment includes is made of a material such as glass that is transparent relative to light to be used with the optical component (normally visible light). Glass materials that can be used for the purpose of the present invention include alkali-containing glass, non-alkali glass, aluminosilicate glass, borosilicate glass, barium-based glass, lanthanum-based glass, titanium-based glass and fluorine-based glass and an appropriate one of such glass materials may be selected for this embodiment by considering the desired properties thereof including refractive index.

An antireflection coating 3 having a fine textured structure of less than the use wavelength is formed on the optically effective area (smooth surface area 1b) at the concave surface side of the substrate, which is a concave meniscus lens. Since the fine textured structure has an in-plane dimension (length measured along the surface) of less than the use wavelength, the structure neither scatters nor refracts incoming and outgoing rays of light to provide an advantage of reducing the ratio of rays of light that are reflected at the interface of the substrate and the outside (normally air) by interposing a layer representing a refractive index found somewhere between the refractive index of the substrate and that of the outside so as to alleviate the refractive index gap at the interface.

This antireflection coating 3 is preferably a film made of aluminum-containing plate-like crystals whose surface shows a finely textured profile. The plate-like crystals can be formed by immersing an aluminum-containing film in hot water or exposing an aluminum-containing film to steam so as to dissolve the surface of the aluminum-containing film and cause the dissolved film to redeposit in a manner as described in Japanese Patent Application Laid-Open No. 2006-259711 or Japanese Patent Application Laid-Open No. 2005-275372. Such an aluminum-containing film may be a film containing aluminum oxide as principal ingredient that can be formed by liquid phase method such as sol-gel method or a film made of metal aluminum, an aluminum-containing alloy or an oxide of either of them that can be formed by gas phase method, which may typically be CVD method or PVD method such as vapor deposition or sputtering. As such an aluminum-containing film is brought into contact with hot water or steam so as to dissolve the surface thereof and cause the surface thereof to redeposit, a fine textured structure made of plate-like crystals containing aluminum oxide as principal ingredient is produced.

The antireflection coating 3 having a fine textured structure is formed on the smooth surface area 1b that is the optically effective area on the concave surface so as to include a film thickness decreasing region (film thickness inclined region) 12, which is a region that includes the edge of the coating 3 and extends along the edge, the region 12 being formed so as to show a thickness that decreases toward the edge. With regard to the process of forming an antireflection coating 3 so as to make the film include a film thickness decreasing region by patterning, when a gas phase process (vacuum film forming method) is employed, an outer peripheral area of the optically effective area (smooth surface area 1b) is masked and subsequently subjected to an immersion process of immersing the film in hot water. Then, as a result, a film thickness decreasing region 12 can be formed along the edge of the antireflection coating 3 having a fine textured structure. On the other hand, when a liquid phase process (sol-gel method) is employed, a film thickness decreasing region 12 can be formed along the edge of the antireflection coating 3 having a fine textured structure by using a masking technique at the time of spray coating for film formation or by spin coating, subsequently wiping an outer peripheral area of the lens by means of an wiper impregnated with a solvent and then immersing the lens in hot water.

The surrounding surface area 1c and the end lateral surface 1d at the concave surface side of the substrate 1, which is a concave meniscus lens, constitute an optically non-effective area, which is a rough surface area whose Ra is between about 1 μm and about 50 nm. A light-shielding coating film 2 is formed at least in a region of the optically non-effective area (the entire optically non-effective area in the instance of FIG. 2) that adjoins the optically effective area. The light-shielding coating film 2 penetrates from the surrounding surface area 1c, which is an optically non-effective area, into the smooth surface area 1b, which is an optically effective area, and the edge of the light-shielding coating film 2 is located in the outer peripheral part of the smooth surface area 1b. This light-shielding coating film 2 is a coating film that is opaque at the use wavelength. The light-shielding coating film 2 is formed by applying a paint prepared by black dye or compounding dyes and pigments of various colors, opaque particles, resin and so on and drying the applied paint. Techniques that can be used for the application of the paint include brush painting, inkjet painting, the use of a jet dispenser and dye coating. Note, however, the use of an automatic paining technique selected from inkjet painting, jet dispenser painting and dye coating, which are non-contact painting techniques, is desirable because, when the technique of brush painting is used by a skilled operator, the quality of the painted film material depends on the skill of the operator and can vary to a large extent.

In the outer peripheral area of the smooth surface area 1b at the concave surface side, which is an optically effective area, a region of the light-shielding coating film 2, which is an opaque coating film, that extends along the edge of the light-shielding coating film 2 and penetrates into the smooth surface area 1b from the surrounding surface area 1c, which is a rough surface area, is laid on a region extending along the edge of the antireflection coating 3 having a fine textured structure as illustrated in FIG. 3. In this instance, for the purpose of suppressing a phenomenon of film floating or film peeling of the antireflection coating 3, the light-shielding coating film 2 may be made to show a small thickness and/or the overlap width 11 of the antireflection coating 3 and the light-shielding coating film 2 may be reduced to alleviate the tensile stress that is concentratedly found at an end portion of the light-shielding coating film 2.

However, the phenomenon of film floating cannot be prevented from taking place simply by reducing the film thickness of the light-shielding coating film so as to make the film thickness to be equal to about 0.5 µm, which is not greater than the recommended film thickness, if the overlap width becomes not less than 100 µm. If, on the other hand, the film thickness of the light-shielding coating film is made to be less than 0.5 µm, the light shielding performance of the light-shielding coating film 2 becomes unsatisfactory and the reflection of light by the surface of the light-shielding coating film becomes greater than the reflection of light by the antireflection coating to consequently increase the amount of harmful rays of light. Differently stated, when the overlap width 11 is made to be not less than 100 µm, flares and ghost cannot be prevented from taking place if the film thickness of the light-shielding coating film is reduced.

As a result of looking into the film thickness necessary for the light-shielding coating film to operate satisfactorily, it was found that flares and ghost can be prevented from taking place without any problem when the film thickness of the light-shielding coating film is made to be not less than 3 µm. Note, however, that a film thickness greater than 50 µm is not desirable because such a large film thickness induces cracks to appear in the light-shielding coating film itself. It was also found that the light-shielding coating film performs only unsatisfactorily to suppress the phenomenon of flares and ghost when the film thickness of the light-shielding coating film is less than 3 µm. Also note that, the thickness of the light-shielding coating film becomes to be equal to nil at the edge thereof and hence the light-shielding coating film preferably shows a steep thickness inclination at and near the edge thereof, although there arises no problem at all when the film thickness is not less than 3 µm and not more than 50 µm at positions separated from the edge by 50 µm.

On the basis of the above-described findings, an attempt was made to prevent the phenomenon of film floating of the antireflection coating 3 from taking place by reducing the overlap width 11 of the antireflection coating 3 and the light-shielding coating film 2. As a result of the studies, it was found that both the phenomenon of film floating and film peeling of the antireflection coating 3 and the phenomenon of flares and ghost can be suppressed by making the overlap width 11 of the antireflection coating 3 having a fine textured structure and the light-shielding coating film 2 to be not greater than 50 µm even when the light-shielding coating film 2 is formed so as to show a film thickness of 3 µm, which is the recommended film thickness. Note, however, that in order to achieve the above objective, the overlap width 11 of the antireflection coating 3 and the light-shielding coating film 2 needs to be controlled on a stable basis at the time of forming the light-shielding coating film 2 by painting. Also note that care should be taken so as not to allow any region that is free both from the antireflection coating 3 and the light-shielding coating film 2 to exist between the antireflection coating 3 and the light-shielding coating film 2 on the substrate. In other words, the overlap width 11 of the antireflection coating 3 and the light-shielding coating film 2 should not be made to be equal to nil and the overlap width 11 needs to be at least 0.5 µm.

As a result of intensive research efforts, it was found that the wettability of the light-shielding coating film 2 varies to a great extent as a function of the difference in the film thickness of the antireflection coating 3 having a fine textured structure and hence a self-aligned coating operation can be conducted by exploiting this characteristic. Additionally, as a result of looking into the relationship between the overlap width 11 of the antireflection coating 3 having a fine textured structure and the light-shielding coating film 2 and the width of the film thickness decreasing region 12 of the antireflection coating 3, they came to find that the overlap width 11 of the antireflection coating 3 and the light-shielding coating film 2 can be suppressed to be not greater than 50 µm when the width of the film thickness decreasing region 12 of the antireflection coating 3 is not greater than 1.8 mm. It was also found that, if the width of the film thickness decreasing region 12 is not more than 50 µm, the edge position of the light-shielding coating film 2 can be held within the width of the film thickness decreasing region 12 of the antireflection coating 3 until the width of the film thickness decreasing region 12 is reduced down to 5 µm due to the self-alignment effect. Differently stated, the width of the film thickness decreasing region 12 is preferably not less than 5 µm and not more than 1.8 mm. Note that, "the width" of the film thickness decreasing region 12 refers to the in-plane distance (the distance as measured along the surface of the substrate) for the relative film thickness of the antireflection coating 3 (the relative value when the average film thickness is made equal to 1 in the region other than the film thickness decreasing region) to be decreased from 1.0 to 0.1 as measured in the direction of thickness inclination of the film thickness decreasing region.

Furthermore, the relationship between the wettability of the light-shielding coating film and the film thickness of the antireflection coating having a fine textured structure was investigated. As a result, it was found that the film thickness of the antireflection coating having a fine textured structure that maximizes the wettability of the light-shielding coating film is within the range between 20 µm and 50 nm and the wettability of the light-shielding coating film becomes worse when the film thickness of the antireflection coating having a fine textured structure exceeds 100 nm. Meanwhile, the wettability of the light-shielding coating film relative to the glass substrate varies depending on the glass material of the substrate. The wettability of lanthanum-based glass is high relative to the light-shielding coating film because the surface energy of lanthanum-based glass is low, whereas the surface energy of titanium-based glass is high and the wettability of light-shielding coating film made of titanium-based glass is substantially equal to that of an antireflection coating having a fine textured structure whose film thickness is not less than 150 nm (recommended value for the height of antireflection coating). In other words, when titanium-based glass whose wettability is low is employed for the substrate, due to the self-alignment feature, the edge of the light-shielding coating film can be held within the width of the film thickness decreasing region by utilizing the fact that the wettability in the intermediate film thickness part of the film thickness decreasing region of the antireflection coating having a fine textured structure is high. Thus, a method of manufacturing an optical component according to the present invention is a method of holding the edge of the light-shielding coating film within the width of the film thickness decreasing region without relying on the surface energy of the substrate.

A technique of observing the surface of the antireflection coating having a fine textured structure through a SEM or a TEM after FIB processing (flux of ion beam processing) can be used as a technique of checking if a film thickness decreasing region is formed or not in a region of the antireflection coating extending along the edge of the antireflection coating having a fine textured structure.

On the other hand, as the film thickness of the antireflection coating having a fine textured structure is reduced, the average period of the fine textured structure changes. Therefore, if a film thickness decreasing region has been formed or not can be checked by seeing a planar (surface) SEM image, utilizing this fact. Differently stated, the film thickness of a fine textured structure can be determined by determining the average period of the fine textured structure from a planar SEM image of the structure and referring to the relationship between the average period and the film thickness of fine textured structure that has been determined in advance. Techniques that can be used to determine the average period of a fine textured structure from a planar SEM image thereof include a technique of using the two-dimensional Fourier transform. Software that can be used for frequency analysis includes ImageJ developed by the National Institute of Health (NIH) of the U.S.A.

Figure 4:
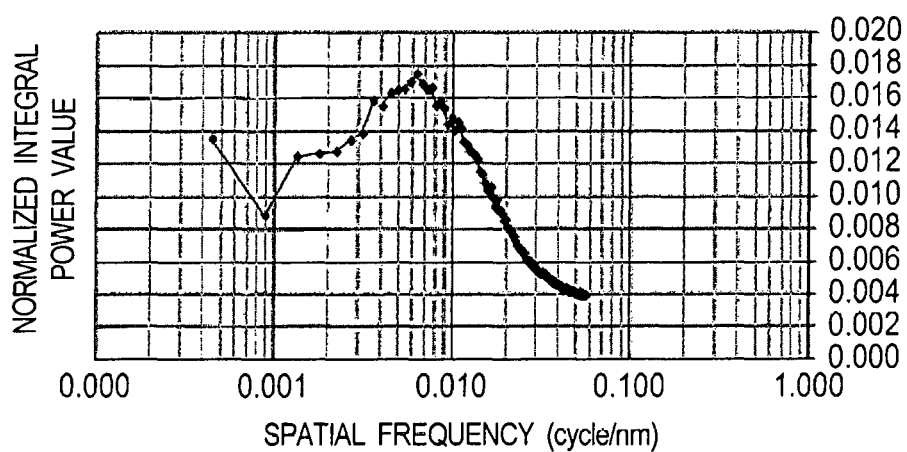
FIG. 4 is an exemplar normalized integral power spectrum used to computationally determine the average period of a fine textured structure.

A frequency analysis can be conducted by selecting an analysis domain consisting of pixels of a power of 2 from the target image, executing the FFT (fast Fourier transform) and determining the normalized integral power spectrum from the power value of the obtained two-dimensional power spectrum. Note that the normalized integral power spectrum can be determined by putting the values of 256 gradations back to the original power values by exponential transformation, integrating the power values found on a circle centered at the origin and dividing the integrated value by the total sum of the power values other than the DC component (center value) for normalization. FIG. 4 illustrates the normalized integral power spectrum obtained by frequency analysis of the planar SEM image observed when the height of a fine textured structure is 220 nm. The average period of the fine textured structure was computationally determined on the basis of the normalized integral power spectrum illustrated in FIG. 4 by subjecting the power spectrum data to a curve fitting operation within the domain of spatial frequencies between 0.002 and 0.02 cycles/nm and using the spatial frequency corresponding to the maximum value of the approximated curve. As a result, the average period was found to be 180 nm with dispersion of ±10 nm when the height of the fine textured structure was 220 nm. Namely, it is safe to assume that the height of the fine textured structure changed when the average period determined by means of the above-described method went out of the range between 170 and 190 nm. As a result, it was found that the film thickness and the average period of the film thickness decreasing region of the fine textured structure having a height of 220 nm change in such a manner that, as the film thickness decreases, the average period falls below 160 nm once and thereafter rises above 200 nm. Thus, it was found that, when the height of 220 nm of the fine textured structure is selected as reference value for the height (relative height value=1), the height of the fine textured structure is 88 nm (relative height value=0.4) when the average period is 157 nm and the height of the fine textured structure is 22 nm (relative height value=0.1) when the average period is 216 nm.

Now, the method of manufacturing an optical component according to the present invention will be described in detail below. Table 1 below summarily shows the results obtained by the measurements and the evaluations in Examples and Comparative Examples that will be described below.

Example 1

A lens (outer diameter: 66 mm, inner diameter: 34 mm) having a cross-sectional profile as illustrated in FIG. 2 and prepared by using optical glass S-LAH53 (nd=1.806) available from Ohara was brought in.

The brought-in lens was cleaned with alkali detergent by ultrasonic cleaning and subsequently dried in an oven. Thereafter, sol of an aluminum oxide precursor was dropped on the lens and subjected to a spin coating operation for 20 seconds with a rate of revolution of 3,000 rpm and then a peripheral part of the smooth surface $1b$ on the lens concave surface side was wiped by means of an urethane sponge available from Aion that had been soaked with 2-ethyl butanol solvent (SOFRAS: tradename). Thereafter, the lens was baked in a hot air circulation oven at 140° C. for 30 minutes to produce an amorphous aluminum oxide film. Then, an antireflection coating having a fine textured structure was formed on the smooth surface on the concave surface side of the lens except a peripheral part thereof by immersing the lens in 75° C. hot water for 20 minutes.

Then, light-shielding paint GT-7H (tradename) available from Canon Chemicals was applied to the outer peripheral surface (end lateral surface $1d$ and surrounding surface $1c$) that was a rough surface with arithmetic average roughness Ra between 1 μm and 50 μm and also to an peripheral part of the smooth surface $1b$ on the concave surface side that was adjoining the outer peripheral surface and located at the inside thereof to produce a light-shielding coating film there. The application technique used for the above application process was a non-contact painting technique using a jet dispenser. At this time, care was taken so as not to produce any gap between the edge of the light-shielding paint layer obtained as a result of the paint application and the edge of the antireflection coating having a fine textured structure that had been formed in advance.

After forming an optical system by using the lens on which the antireflection coating and the light-shielding coating film had been produced in the above-described manner, the obtained optical system was evaluated for existence or non-existence of ghost. As a result, the optical system was found to be free from any problem of ghost because no ghost had been observed.

After evaluating the lens for ghost, an area including the edge of the light-shielding coating film and that of the fine textured structure and their vicinity was observed by way of planar SEM and cross-sectional SEM after FIB processing to find that an edge portion of the light-shielding coating film was laid on an edge portion of the fine textured structure. The film thickness of the fine textured structure, that of the light-shielding coating film and the profiles of them were measured on the basis of the results of the observation.

As a result of the measurement, the film thickness of the light-shielding coating film at positions separated toward the outside from the edge thereof by 50 μm was between 4 and 5 μm and the film thickness of the light-shielding coating film at positions on the smooth surface $1b$ that were separated further from the 50 μm positions was between 4 and 10 μm. On the other hand, a film thickness decreasing region whose film thickness is decreased toward the edge had been formed in a region extending along the edge of the antireflection coating having a fine textured structure and the width of the region was between 5 and 10 μm. Note that the width of the overlap of the fine textured structure and the light-shielding coating film was between 1 and 3 μm.

Figure 5:
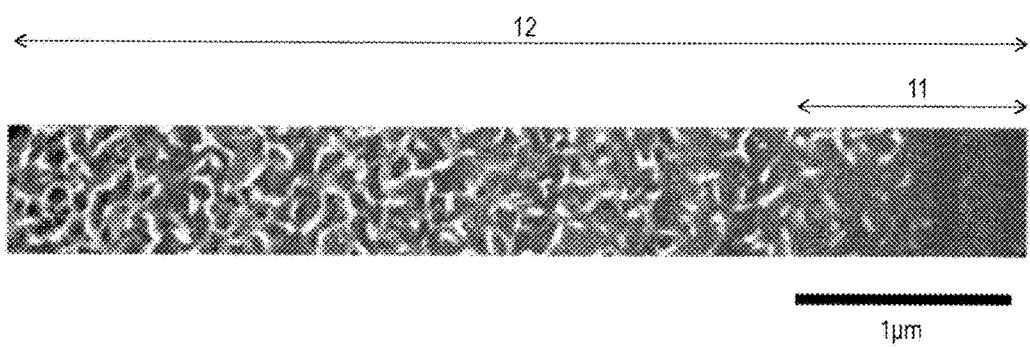
FIG. 5 is an exemplar surface SEM image of part of a region where an antireflection coating having a fine textured structure and a light-shielding coating film overlap with each other.

FIG. 5 illustrates a planar (surface) SEM image of part of the film thickness decreasing region 12 of the fine textured structure including the region 11 where the fine textured structure and the light-shielding coating film overlap with each other. The film thickness and the average period of the fine textured structure in the optically effective area of the lens were respectively 220 nm and 180 nm. On the other hand, the average period of the film thickness decreasing region 12 of the fine textured structure illustrated in FIG. 4 was 148 nm as minimum and 207 nm at a position on the edge of the light-shielding coating film. The height of the fine textured structure that corresponded to the average period of 207 nm was confirmed to be equal to 20 nm by way of cross-sectional TEM after FIB processing.

Example 2

A lens having an antireflection coating and a light-shielding coating film was prepared in this example as in Example 1 except that the technique employed for forming the light-shielding coating film having a fine textured structure of the example was different from that employed in Example 1. More specifically, instead of forming an amorphous aluminum oxide film by means of sol-gel method and baking, after putting a mask on a lens substrate, an aluminum oxide film was formed by means of reactive sputtering so as to put the edge thereof at a position 0.1 mm inside from the outer peripheral edge of the concave side smooth surface of the lens. Otherwise, the manufacturing steps of Example 1 were followed in this example.

After forming an optical system by using the lens prepared in the above-described manner, the optical system was evaluated for existence or non-existence of ghost. As a result, the optical system was found to be free from any problem of ghost because no ghost had been observed.

After evaluating the ghost of the lens, the film thickness and the profile of the overlap region of the light-shielding coating film and the fine textured structure were observed by way of planar SEM and cross-sectional SEM after FIB processing, in the same way as Example 1.

As a result of the observations, the film thickness of the light-shielding coating film at positions separated toward the outside from the edge thereof by 50 μm was between 4 and 5 μm and the film thickness of the light-shielding coating film at positions on the smooth surface 1b that were separated further from the 50 μm positions was between 4 and 10 μm. On the other hand, the width of the film thickness decreasing region of the antireflection coating of the fine textured structure was between 1.5 and 1.8 mm and the width of the overlap of the fine textured structure and the light-shielding coating film was between 1.8 and 50 μm.

Example 3

A lens having an antireflection coating and a light-shielding coating film was prepared in this example as in Example 2 except that a method of producing the light-shielding coating film different from the method of producing the light-shielding coating film used in Example 2 was employed in this example. More specifically, instead of using a jet dispenser, the light-shielding coating film of this example was formed by pressing a polyurethane sponge (RUBYCELL: tradename, available from Toyo Polymer) that was soaked with paint solution (GT-7II) against the edge of the lens that was being driven to rotate for paint application. All the remaining manufacturing steps of this example were same as those of Example 2.

After forming an optical system by using the lens prepared in the above-described manner, the optical system was evaluated for existence or non-existence of ghost. As a result, the optical system was found to be free from any problem of ghost because no ghost had been observed.

After evaluating the ghost of the lens, the film thickness and the profile of the overlap region of the light-shielding coating film and the fine textured structure were observed by way of planar SEM and cross-sectional SEM after FIB processing, in the same way as Example 1.

As a result of the observations, the film thickness of the light-shielding coating film at positions separated toward the outside from the edge thereof by 50 μm was between 8 and 10 μm and the film thickness of the light-shielding coating film at positions on the smooth surface 1b that were separated further from the 50 μm positions was between 8 and 50 μm. On the other hand, the width of the film thickness decreasing region of the antireflection coating of the fine textured structure was between 1.5 and 1.8 mm and the width of the overlap of the fine textured structure and the light-shielding coating film was between 11 and 35 μm.

Example 4

A lens having an antireflection coating and a light-shielding coating film was prepared in this example as in Example 2 except that a substrate of optical glass S-TIH53 available from Ohara (nd=1.847) was used in this example instead of the substrate of Example 2.

After forming an optical system by using the lens prepared in the above-described manner, the optical system was evaluated for existence or non-existence of ghost. As a result, the optical system was found to be free from any problem of ghost because no ghost had been observed.

After evaluating the ghost of the lens, the film thickness and the profile of the overlap region of the light-shielding coating film and the fine textured structure were observed by way of planar SEM and cross-sectional SEM after FIB processing, in the same way as Example 1.

As a result of the observations, the film thickness of the light-shielding coating film at positions separated toward the outside from the edge thereof by 50 μm was between 4 and 5 μm and the film thickness of the light-shielding coating film at positions on the smooth surface 1b that were separated further from the 50 μm positions was between 4 and 10 μm. On the other hand, the width of the film thickness decreasing region of the antireflection coating of the fine textured structure was between 1.5 and 1.8 mm and the width of the overlap of the fine textured structure and the light-shielding coating film was between 18 and 45 μm.

Example 5

A lens having an antireflection coating and a light-shielding coating film was prepared in this example as in Example 1 except that the solid ingredient concentration of the light shielding paint applied by means of a jet dispenser was reduced from the solid ingredient concentration of Example 1 for forming the light-shielding coating film.

After forming an optical system by using the lens prepared in the above-described manner, the optical system was evaluated for existence or non-existence of ghost. As a result, the optical system was found to be free from any problem of ghost because no ghost had been observed.

After evaluating the ghost of the lens, the film thickness and the profile of the overlap region of the light-shielding coating film and the fine textured structure were observed by way of planar SEM and cross-sectional SEM after FIB processing, in the same way as Example 1.

As a result of the observations, the film thickness of the light-shielding coating film at positions separated toward the outside from the edge thereof by 50 μm was between 3 and 4 μm and the film thickness of the light-shielding coating film at positions on the smooth surface 1b that were separated further from the 50 μm positions was between 3 and 8 μm. On the other hand, the width of the film thickness decreasing region of the antireflection coating of the fine textured structure was between 5 and 10 mm and the width of the overlap of the fine textured structure and the light-shielding coating film was between 0.5 and 2 µm.

Comparative Example 1

A lens having an antireflection coating and a light-shielding coating film was prepared in this example as in Example 2 except that the position of ejecting the paint solution was brought closer to the lens center at the time of paint solution application to the light-shielding coating film by means of a jet dispenser.

After forming an optical system by using the lens prepared in the above-described manner, the optical system was evaluated for existence or non-existence of ghost. As a result, an appearance of strong ghost was confirmed.

After evaluating the ghost of the lens, the film thickness and the profile of the overlap region of the light-shielding coating film and the fine textured structure were observed by way of planar SEM and cross-sectional SEM after FIB processing, in the same way as Example 1.

As a result of the observations, the film thickness of the light-shielding coating film at positions separated toward the outside from the edge thereof by 50 µm was between 4 and 5 µm and the film thickness of the light-shielding coating film at positions on the smooth surface 1b that were separated further from the 50 µm positions was between 4 and 10 µm. On the other hand, the width of the film thickness decreasing region of the antireflection coating of the fine textured structure was between 1.5 and 1.8 mm and the width of the overlap of the fine textured structure and the light-shielding coating film was between 45 and 55 µm.

Comparative Example 2

A lens having an antireflection coating and a light-shielding coating film was prepared in this example as in Example 1 except that the solid ingredient concentration of the applied light shielding paint was reduced further from the solid ingredient concentration of Example 5 for forming the light-shielding coating film.

After forming an optical system by using the lens prepared in the above-described manner, the optical system was evaluated for existence or non-existence of ghost. As a result, an appearance of strong ghost was confirmed.

After evaluating the ghost of the lens, the film thickness and the profile of the overlap region of the light-shielding coating film and the fine textured structure were observed by way of planar SEM and cross-sectional SEM after FIB processing, in the same way as Example 1.

As a result of the observations, the film thickness of the light-shielding coating film at positions separated toward the outside from the edge thereof by 50 µm was between and 3 µm and the film thickness of the light-shielding coating film at positions on the smooth surface 1b that were separated further from the 50 µm positions was between 2 and 7 µm. On the other hand, the width of the film thickness decreasing region of the antireflection coating of the fine textured structure was between 5 and 10 µm and the width of the overlap of the fine textured structure and the light-shielding coating film was between 1 and 3 µm.

TABLE 1

| | Light-shielding coating film thickness (50 µm from edge) | Light-shielding coating film thickness (smooth area) | Width of film thickness decreasing region of antireflection coating | Overlap width of light-shielding coating film/ antireflection coating | Alumina film forming method | Application method for light-shielding coating film | Lens | Appearance of ghost |
|---|---|---|---|---|---|---|---|---|
| Example 1 | 4 to 5 µm | 4 to 10 µm | 5 to 10 µm | 1 to 3 µm | Sol-gel → wiping | GT-7II dispenser application | S-LAH53 | No |
| Example 2 | 4 to 5 µm | 4 to 10 µm | 1.5 to 1.8 mm | 18 to 50 µm | Mask sputtering | GT-7II dispenser application | S-LAH53 | No |
| Example 3 | 8 to 10 µm | 8 to 50 µm | 1.5 to 1.8 mm | 11 to 35 µm | Mask sputtering | GT-7II brush painting | S-LAH53 | No |
| Example 4 | 4 to 5 µm | 4 to 10 µm | 1.5 to 1.8 mm | 18 to 45 µm | Mask sputtering | GT-7II dispenser application | S-TIH53 | No |
| Example 5 | 3 to 4 µm | 3 to 8 µm | 5 to 10 µm | 0.5 to 2 µm | Sol-gel → wiping | GT-7II dispenser application | S-LAH53 | No |
| Comp Example 1 | 4 to 5 µm | 4 to 10 µm | 1.5 to 1.8 mm | 45 to 55 µm | Mask sputtering | GT-7II dispenser application | S-LAH53 | Yes |
| Comp Example 2 | 2 to 3 µm | 2 to 7 µm | 5 to 10 µm | 1 to 3 µm | Sol-gel → wiping | GT-7II dispenser application | S-LAH53 | Yes |

As described above in detail, the present invention provides a high quality optical component having an antireflection coating of a fine textured structure and a light-shielding coating film that overlap with each other on the smooth surface of the lens, which is an optically effective area, that shows an excellent environmental durability and is free from appearance of ghost due to film floating and film peeling of the antireflection coating having a fine textured structure attributable to degradation over time and also a method of manufacturing such an optical component.

An optical component according to the present invention can find applications in the field of optical equipment, including cameras, binoculars, microscopes, semiconductor exposure devices etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-079514, filed Apr. 12, 2016, which is hereby incorporated by reference herein in its entirety.

What is claimed is:

1. An optical component having a surface including an optically effective area having an antireflection coating arranged thereon and an adjoining optically non-effective area having a light-shielding coating film arranged thereon,
wherein the light-shielding coating film is formed such that an edge portion of the light-shielding coating film lies on an edge portion of the antireflection coating with an overlap width between 0.5 μm and 50 μm, and
wherein a thickness of the antireflection coating decreases toward an edge of the antireflection coating, which is in the edge portion of the antireflection coating, in an area having a width between 5 μm and 1.8 mm from the edge of the antireflection coating.

2. The optical component according to claim 1, wherein the optically effective area having the antireflection coating arranged thereon shows a smooth surface whereas the optically non-effective area having the light-shielding coating film arranged thereon shows a rough surface and the overlap area is located on the smooth surface.

3. The optical component according to claim 2, wherein the antireflection coating has a fine textured structure of less than a use wavelength formed on the smooth surface, and the light-shielding coating film is an opaque coating film formed on the rough surface.

4. The optical component according to claim 3, wherein the optically effective area is a concave surface of a lens.

5. An optical equipment having an optical system comprising a plurality of optical components, wherein at least one of the optical components is the optical component according to claim 1.

6. A method of manufacturing an optical component comprising:
a first step of preparing a transparent substrate having a surface;
a second step of forming an antireflection coating on the surface so that a thickness of the antireflection coating decreases toward an edge of the antireflection coating in an area having a width between 5 μm and 1.8 mm from the edge of the antireflection coating; and
a third step of forming a light-shielding coating film as opaque coating film such that an edge portion of the light-shielding coating film lies on an edge portion of the antireflection coating having the thickness decreasing toward the edge with an overlap width between 0.5 μm and 50 μm.

7. The method according to claim 6, wherein the light-shielding coating film is formed so as to show a film thickness of 3 μm to 50 μm, except an area located within 50 μm from the edge of the antireflection coating.

8. The method according to claim 6, wherein the antireflection coating is formed by immersing an aluminum-containing film formed by sol-gel method in hot water or exposing the aluminum-containing film to steam.

* * * * *